United States Patent [19]
Humphrey

[11] Patent Number: 5,133,288
[45] Date of Patent: Jul. 28, 1992

[54] FISH HATCHERY ASSEMBLY

[76] Inventor: William K. Humphrey, 1831 NE. 38th St., Apt. #100, Fort Lauderdale, Fla. 33308

[21] Appl. No.: 808,170

[22] Filed: Dec. 13, 1991

[51] Int. Cl.$^5$ ............................................. A01K 61/00
[52] U.S. Cl. ...................................................... 119/3
[58] Field of Search ................... 119/3, 5; D 30/101, D 30/102, 103, 104, 105, 106, 107

[56] References Cited

U.S. PATENT DOCUMENTS

| | | | |
|---|---|---|---|
| 4,913,811 | 4/1990 | Huane et al. ................. | 119/5 X |
| 4,957,623 | 9/1990 | Henzlik ........................ | 119/5 X |

*Primary Examiner*—Gene Mancene
*Assistant Examiner*—Thomas Price
*Attorney, Agent, or Firm*—Malloy, Downey & Malloy

[57] ABSTRACT

A fish hatchery assembly, to be used to segregate a fish tank into a portion for larger fish to swim and a portion where newly born fish may be kept safe, without requiring the removal of the mother fish to a separate area, the assembly including a filtering panel disposed horizontally and having a corrugated type configuration including a plurality of upper apexes and lower apexes, a vertical wall attached at a proximate end of the horizontal filtering panel and extending downward to contact a bottom surface of the fish tank, and a separator plate to keep larger fish from swimming above the filtering panel. The assembly contacts opposite inner sides of the fish tank to effectively divide the fish tank into two compartments, and includes a plurality of slots extending along each of the upper apexes of the filtering panel such that newly born fish may pass therethrough, but larger fish may not.

4 Claims, 2 Drawing Sheets

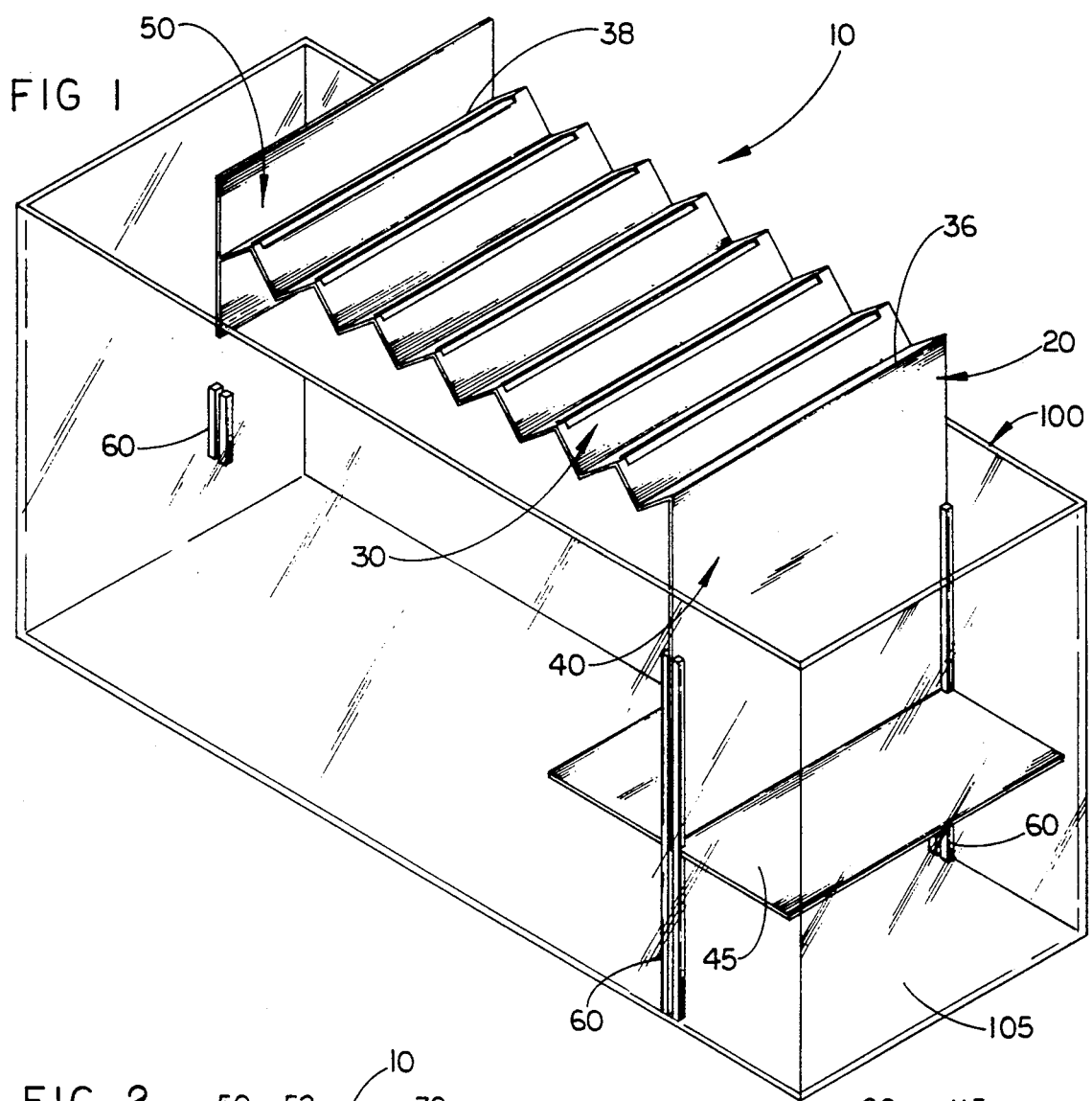
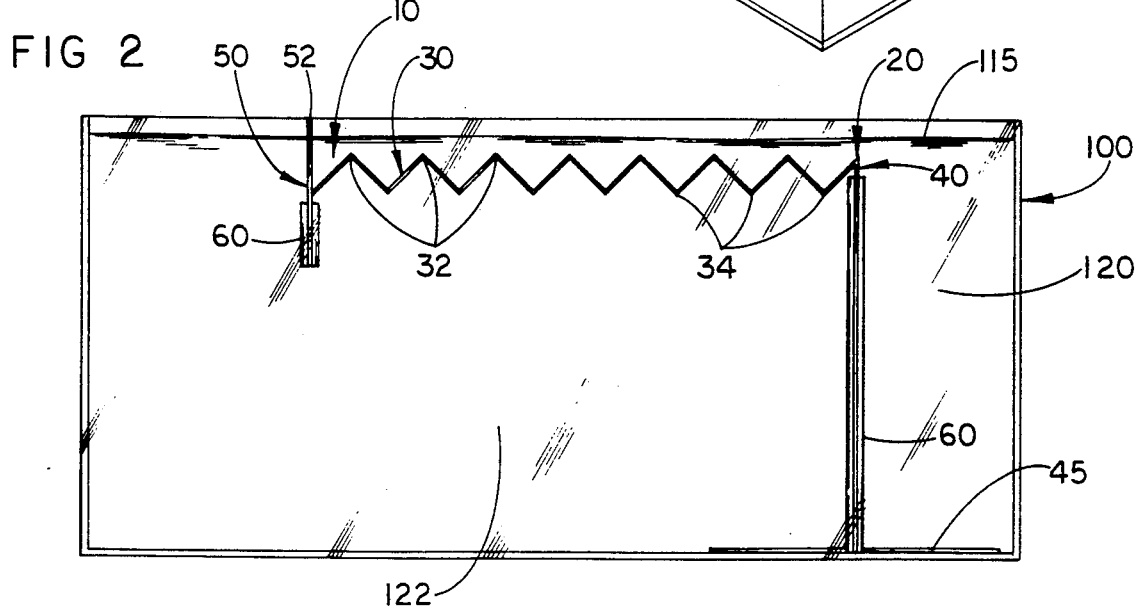

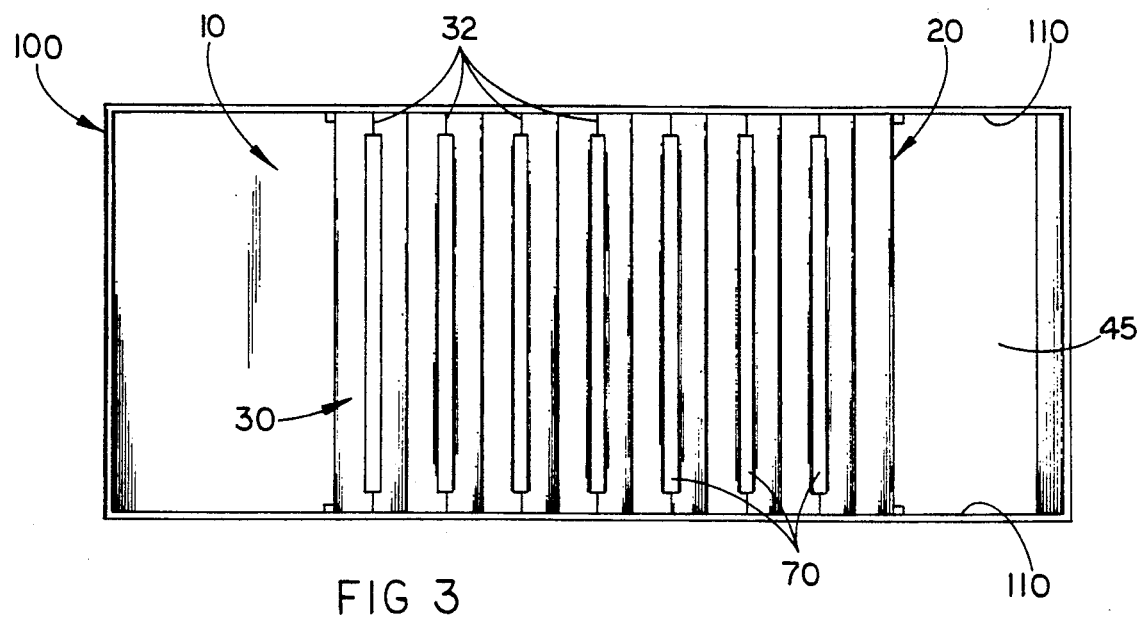
FIG 3
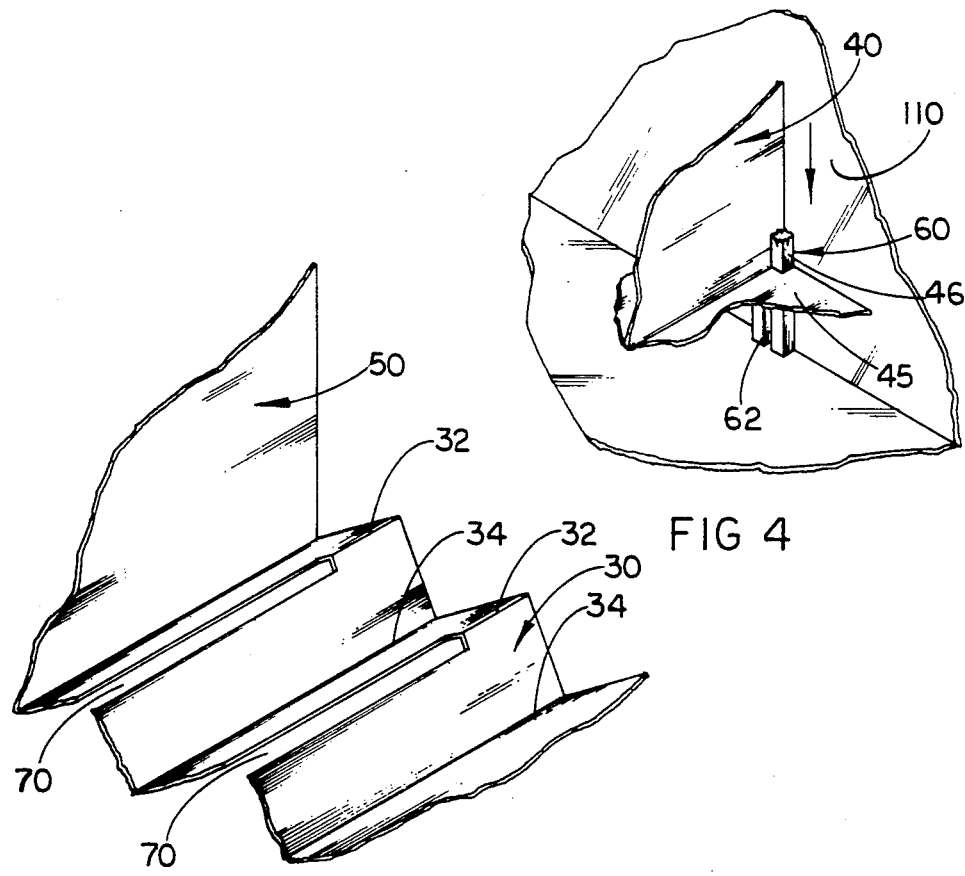
FIG 4
FIG 5

FISH HATCHERY ASSEMBLY

BACKGROUND OF THE INVENTION

1. Field of the Invention

This invention relates to a fish hatchery assembly adapted to divide a fish tank into an upper tank compartment and a lower tank compartment wherein baby fish alone will pass into the upper compartment, thereby providing an effective means of segregating baby fish from adult fish without the need to segregate the mother fish and constantly monitor the mother fish until birth.

2. Description of the Prior Art

Fish breeding is a popular and profitable activity among fish owners. Unfortunately, due to cannibalistic nature of many fish, great care must be taken to ensure the safety of newborn fish. For these reasons, it would be beneficial to provide an assembly which will effectively segregate adult fish from newborns without constant monitoring or complicated arrangements.

In the art, there have been various inventions designed to segregate a fish tank into separate compartments. Such inventions can be seen in the patents to Goldman, et al., U.S. Pat. No. 3,288,110, Halpert, U.S. Pat. No. 3,291,098, Hackman, et al., U.S. Pat. No. 3,304,912, and Davis, U.S. Pat. No. 4,120,265. Unfortunately, partitions such as those disclosed in the referenced patents, merely divide a fish tank into two halves such that a pregnant mother fish must be placed into the separate compartment and watched until she gives birth. The constant attention is necessary because a mother fish will also eat baby fish if left in the same environment, therefore she must be quickly removed from the proximity of the baby fish and placed with the adult fish. Other breeder designs, such as referenced in Martinez, U.S. Pat. No. 3,464,387, and Stasio, U.S. Pat. No. 3,693,591 have been devised to attempt to facilitate immediate segregation. Unfortunately, these designs completely segregate the top and bottom of the fish tank such that either the baby fish or the adult fish cannot reach the top surface of the water for feeding and other necessary functions. Further, the baby fish are only provided with a small environment from which they must be transferred for growth. Finally, U.S. Pat. No. 3,584,602 to Stasio discloses a complex and separate compartment for a mother fish having a grading at a lower surface thereof such that baby fish may pass therethrough and remain in a separate lower compartment. Such a design, is complex and confines the mother fish and the baby fish to a small area until transferred.

As a result, it is still necessary to provide a fish hatching assembly which is easily installed and removed from an ordinary fish tank, provides a safe and comfortable environment for baby fish as well as adult fish, does not require constant monitoring and provides an environment wherein baby fish may grow in the same tank until the assembly is removed, at which time the adult fish and grown young fish may swim together. Applicant's invention is designed precisely to meet these needs, and is structured such that baby fish, who after dropped from the mother naturally tend to swim toward the surface, will easily and effectively be guided into an upper compartment in the fish tank because of the angled surfaces and elongate slots provided in a horizontal filtering panel of the assembly.

SUMMARY OF THE INVENTION

The present invention is directed towards a fish hatching assembly to be used to effectively divide a fish tank into a safe upper compartment for baby fish and a comfortable lower compartment for adult fish, while allowing facilitated entry of baby fish from the lower compartment into the upper compartment when born. The assembly primarily includes a filtering panel disposed in substantially horizontal orientation below the surface of the water, and having a generally corrugated configuration including a plurality of upper, pointed apexes, and a plurality of lower pointed apexes. The assembly is sufficiently wide so as to contact the opposite inner side wall surfaces of the fish tank, thereby providing complete separation. Attached at a proximal end of the horizontal panel is a vertical wall extending downward so as to contact a bottom surface of the fish tank while positioning the horizontal filtering panels below an upper water surface within the fish tank. Attached at a distal end of the horizontal face, is a separator plate of a height sufficient to protrude from the upper water surface to assure that adult fish below the horizontal filtering panel cannot enter the water above the horizontal face. Extending substantially along each upper apex in the horizontal filtering panel is a cutout slot structured and disposed to enable newborn fish swimming upwardly to the surface to pass therethrough into the segregated upper compartment, while keeping adult fish below. The divider panel can be slidably positioned in a plurality of tracks adhered to the inner wall surfaces of the fish tank, thereby defining the upper compartment and the lower compartment, both of which permit access to the upper water surface.

In view of the foregoing and the problems associated with fish hatchery assemblies in the related art, it is an object of the present invention to provide an effective means of protecting baby fish from adult fish, without needing to remove the mother fish and/or constantly monitor for the precise moment of birth.

It is another object of the present invention to provide a segregated compartment within an ordinary fish tank wherein baby fish may be naturally separated without intervention by the fish owner so that they may mature in the same tank until they may be rejoined with the adult fish.

BRIEF DESCRIPTION OF THE DRAWINGS

For a fuller understanding of the nature of the present invention, reference should be had to the following detailed description taken in connection with the accompanying drawings in which:

FIG. 1 is a perspective view of the fish hatchery assembly.

FIG. 2 is a front elevation view of the fish hatchery assembly.

FIG. 3 is a top plan view of the fish hatchery assembly.

FIG. 4 is an isolated view, in partial cutaway illustrating the track attachment means of the present invention.

FIG. 5 is an isolated view, in partial cutaway illustrating a plurality of slots formed in the upper apexes of the horizontal filtering panel of the present invention.

Like reference numerals refer to like parts throughout the several views of the drawings.

DETAILED DESCRIPTION OF THE PREFERRED EMBODIMENT

Shown throughout FIGS. 1-5 is the fish hatchery assembly of the present invention, generally indicated as 10. As shown in FIG. 1, the fish hatchery assembly 10 primarily includes a panel assembly 20, including a horizontal filtering panel 30, and a vertical wall 40 attached at one end 36 of the horizontal filtering panel 30 and extending downwardly such that a base 45 perpendicularly attached to a lower edge of the vertical wall 40 contacts the bottom surface 105 of the fish tank 100. Integrally formed at an opposite end 38 of the horizontal face 30 is a separator plate 50. The separator plate 50, as best seen in FIG. 2, extends sufficiently upwardly such that an upper edge 52 of the separation plate 50 protrudes above the water surface level 115 within the fish tank 100. Further referring to FIG. 2, the filtering panel 30 is positioned such that an upper compartment 120 for baby fish and a segregated lower compartment 122 for adult and the mother fish, within the fish tank 100 are defined. As shown, the horizontal filtering panel 30 includes a corrugated configuration so as to define a plurality of upper apexes 32 and a plurality of lower pointed apexes 34. The horizontal filtering panel 30 is structured such that baby fish swimming or rising upwardly from the lower compartment 122 towards the upper water surface 115 will be guided to the upper apexes 32 along a top ridge each of the upper apexes 32, and as best seen in FIGS. 3 and 5, are a plurality of elongate cutout slots 70 extending substantially across the length of each upper apex 32, such that baby fish guided towards the upper apex 32 will pass through the slots 70 and into the upper compartment 120.

Referring to FIG. 3, the panel assembly 20 is of a sufficient width to contact the opposite inner surfaces of the sides of the fish tank 100, thereby assuring that adult fish cannot get around the panel assembly and into the upper compartment 120. As detailed in FIG. 4, a plurality of tracks 60 are adhered to the inner surface 110 of the fish tank 100. Each of the tracks 60 includes a groove 62 structured and disposed for sliding receipt of the vertical wall 40 and the separator sheet 50 therealong, thereby allowing facilitated removal and positioning of the panel assembly into an operative position within the fish tank 100. In order to allow the vertical wall 40 to slide completely to the bottom of the groove 62 of the track 60, the base 45 includes a cutout notch 46 which is sized to surround the track 60 permitting sliding passage therethrough.

Applicant's invention, which in a preferred embodiment is made of a rigid and non-corrosive plastic material, is not to be limited except as set forth within the spirit and scope of the claims and within the doctrine of equivalents.

Now that the invention has been described,
What is claimed is:

1. For use with a fish tank, a fish hatchery assembly comprising:
   a divider panel assembly,
   said divider panel assembly including a horizontal filtering panel having a generally corrugated construction including a plurality of upper apexes and a plurality of lower apexes, said filtering panel being sufficiently wide so as to contact opposite inner side wall surfaces of the fish tank along corresponding opposite side edge thereof,
   said panel assembly further including a vertical wall integrally connected with said horizontal filtering panel at one end thereof, and extending downwardly and being supported at a bottom surface of the fish tank while positioning said horizontal filtering panel below an upper water surface level within the fish tank,
   said panel assembly further including a separator plate integrally attached to said horizontal filtering plate at an opposite end thereof, said plate being of a sufficient height to protrude from the upper water surface level, thereby preventing fish below said horizontal filtering panel from entering an area of water above said filtering panel,
   attachment means to secure said vertical wall and separator plate to the inner side walls of the fish tank, thereby defining an upper tank compartment and a lower tank compartment, both of which provide access to the upper water surface level of the fish tank, and
   a plurality of cutout slots extending across each of said plurality of upper apexes of said horizontal filtering panel, said filtering panel and said slots being structured and disposed to allow newly born fish to be guided and accordingly passed upwardly from said lower tank compartment, through said slots and into said upper tank compartment, while preventing a larger fish from passing therethrough, thereby maintaining larger fish in said lower tank compartment and effectively segregating the newly born fish from the larger fish.

2. A fish hatchery assembly as recited in claim 1 wherein said attachment means includes two pairs of elongate tracks adhered to the inner side walls of the fish tank and being structured and disposed for sliding passage of said vertical wall and said separator panel substantially therealong.

3. A fish hatchery assembly as recited in claim 2 wherein said panel includes a base, perpendicularly attached to a lower edge of said vertical wall, and including a pair of oppositely disposed notches to enable said base to be fittable around said tracks such that said vertical wall may slide along said track.

4. A fish hatchery assembly as recited in claim 3 wherein said panel is made of a substantially rigid, non-corrosive plastic or like material.

* * * * *